(12) United States Patent
Thompson-Colon et al.

(10) Patent No.: US 7,750,072 B2
(45) Date of Patent: Jul. 6, 2010

(54) LOWERED EXOTHERM THERMOSET COMPOSITIONS

(75) Inventors: James A. Thompson-Colon, Moon Township, PA (US); Brian Iske, Nashua, NH (US)

(73) Assignees: Bayer MaterialScience LLC, Pittsburgh, PA (US); de neef Construction Chemicals, Inc., Houston, TX (US)

( * ) Notice: Subject to any disclaimer, the term of this patent is extended or adjusted under 35 U.S.C. 154(b) by 600 days.

(21) Appl. No.: 11/604,546

(22) Filed: Nov. 27, 2006

(65) Prior Publication Data

US 2008/0125522 A1    May 29, 2008

(51) Int. Cl.
*C08G 18/42* (2006.01)

(52) U.S. Cl. ........................ 524/500; 524/502; 524/503; 524/505; 524/508; 524/509; 524/511; 524/512

(58) Field of Classification Search ................. 524/500, 524/502, 503, 505, 508, 509, 511, 512
See application file for complete search history.

(56) References Cited

U.S. PATENT DOCUMENTS

| | | | | |
|---|---|---|---|---|
| 4,259,401 | A | 3/1981 | Chahroudi et al. | 428/306 |
| 4,797,160 | A | 1/1989 | Salyer | 106/96 |
| 5,053,446 | A | 10/1991 | Salyer | 524/8 |
| 5,326,822 | A | 7/1994 | Hesse et al. | 525/168 |
| 5,354,809 | A | 10/1994 | Hesse et al. | 525/64 |
| 5,414,043 | A | 5/1995 | Hesse et al. | 525/64 |
| 5,558,943 | A | 9/1996 | Zwecker et al. | 428/458 |
| 5,565,132 | A | 10/1996 | Salyer | 252/70 |
| 5,741,448 | A | 4/1998 | Wiseman | 264/28 |
| 6,265,457 | B1 | 7/2001 | Dolgopolsky et al. | 521/155 |
| 6,348,538 | B1 | 2/2002 | Buhl et al. | 524/513 |

FOREIGN PATENT DOCUMENTS

EP      1 493 777     1/2005

OTHER PUBLICATIONS

Boy Scouts of America Composites Merit Badge—Overview of composite materials, Nov. 27, 2006 http://www.acmanet.org/basa/overview-materials.cfm.
Microthene®F: Powders for SMC/BMC Applications, Equistar A Lyondell Company, p. 1-4.
An introduction to Microthene® Polyolefin Powders for Specialty Applications, Equistar A Lyondell Company, p. 1-9.

*Primary Examiner*—Edward J Cain
(74) *Attorney, Agent, or Firm*—Lyndanne M. Whalen; Noland J. Cheung; John E. Mrozinski, Jr.

(57) ABSTRACT

The present invention provides compositions such as a polymer grout, a molded plastic part, a void-filling plastic material, a concrete-anchoring material and a polymeric casting made from a thermosetting polymer chosen from vulcanized rubbers, polyoxybenzylmethylen-glycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins and at least one phase change material ("PCM"). The compositions of the present invention have a lowered exotherm compared to compositions made from the same thermosetting polymer without the addition of a phase change material. Also provided are improved processes for producing the inventive compositions.

17 Claims, 3 Drawing Sheets

LOWERED EXOTHERM THERMOSET COMPOSITIONS

FIELD OF THE INVENTION

The present invention relates in general to polymeric compositions and, more specifically, to a composition such as a polymer grout, a molded plastic part, a void-filling plastic material, a concrete-anchoring material and a polymeric casting made from a lowered exotherm thermosetting polymer and to improved processes for the production of such compositions by lowering the exotherm of the thermosetting polymer contained therein.

BACKGROUND OF THE INVENTION

Phase change materials ("PCM") have been added to compositions for a number of years, predominantly in the field of thermal energy storage. For example, Chahroudi et al., in U.S. Pat. No. 4,259,401, discloses both structural and non-structural building products incorporating phase change materials. These products are made of a rigid porous matrix structure that is impregnated with the phase change material or which may otherwise contain the phase change material. Three classes of phase change materials are disclosed by Chahroudi et al.: hydrated salts; waxes; and clathrates. Cements, plasters or thermosetting materials are said to be able to form the rigid matrix.

Salyer in a number of patents discloses materials for use in thermal energy storage in buildings. For example, U.S. Pat. No. 4,797,160 issued to Salyer describes compositions for use in thermal energy storage of buildings which contain crystalline, straight chain, alkyl hydrocarbons as phase change materials. The materials of Salyer include cementitious compositions containing the alkyl hydrocarbons neat or in pellets or granules formed by incorporating the alkyl hydrocarbons in polymers or rubbers; and polymeric or elastomeric compositions containing alkyl hydrocarbons.

Salyer in U.S. Pat. No. 5,053,446 discloses a composite said to be useful in thermal energy storage. The composite is formed of a polyolefin matrix having a phase change material such as a crystalline alkyl hydrocarbon incorporated therein and the polyolefin is thermally form stable. The composite of Salyer is said to be useful in forming pellets, sheets or fibers having thermal energy storage characteristics.

U.S. Pat. No. 5,565,132 issued to Salyer describes a thermoplastic, moldable, non-exuding phase change material in the form of a composite useful for thermal energy storage. The composite is said to be preferably a solidified melt mixture of a polyolefin resin, and ethylene copolymer, silica particles and a fatty acid, fatty acid ester, primary alcohol or hydrocarbon phase change material. For a microwave heating capability, a microwave absorbing additive may be added as a fifth major ingredient. The composite of Salyer is said to be able of being formed into a variety of configurations such as pellets, sheets, rods, tubes, plugs for hollow core cement blocks, films, and fibers, all for thermal energy storage uses.

Salyer in U.S. Pat. No. 5,885,475, describes a fiber composition made of a fiber forming polymer and a phase change material integrally incorporated throughout the fiber forming polymer which is either a polyalkylene oxide, polyalkylene ether or mixture of various polyolefins.

U.S. Pat. No. 6,265,457, issued to Dolgopolsky et al., discloses an isocyanate-based polymer foam matrix having disposed therein a particulate material having an enthalpy of endothermic phase transition of at least about 50 J/g. The particulate material is said to act as a heat sink and undergo an endothermic phase change by absorbing a significant portion of the heat of reaction liberated during the process of producing the foam. This heat absorption is said to improve the safety of the process by lowering the maximum exotherm experienced by the foam. There is no teaching or suggestion of utilizing the material of Dolgopolsky et al. with other polymers.

Wolf, in EP 1 493 777 A1, discloses a material for molded articles made of a polymeric base material mixed with porous particles of a filler, the cavities of which are filled with a phase transfer material. Also disclosed by Wolf is a process for the production of the molded article by filling porous particles with phase transfer material, introducing the particles into a polymer and processing the material by injection molding, extrusion, foaming or forming into textiles or other structures.

A web page that may be found at http://www.acmanet.org/bsa/overview-materials.cfm and entitled "Boy Scouts of America Composites Merit Badge-Overview of composite materials" lists a number of inert fillers that may be added to modify the properties of resins and reduce cost. Among those fillers on the list which includes everything from minerals to walnut shells to corn cobs, is "Thermoplastic spheres". However, no guidance is provided as to how to select the proper filler to modify the desired property.

A copending, U.S. patent application Ser. No. 11/257,226, commonly assigned to one of the present assignees describes infrastructure repair and geo-stabilization processes with a low-exotherm polyurethane foam, grout or elastomer containing an organic particulate material capable of absorbing heat. There is no teaching or suggestion of utilizing that organic particulate material with polymers other than polyurethane.

Thermosetting polymers are commonly found in grouts, molded parts, void-filling materials, concrete-anchoring materials and castings. Because such materials are used and/or produced in places where the buildup of heat could not only be undesirable, but in some cases may be potentially dangerous, a need exists in the art for compositions such as polymer grouts, molded plastic parts, void-filling plastic materials, concrete-anchoring materials and polymeric castings that reduce the generation and accumulation of heat.

SUMMARY OF THE INVENTION

Accordingly, the present invention provides compositions such as a polymer grout, a molded plastic part, a void-filling plastic material, a concrete-anchoring material and a polymeric casting made from a thermosetting polymer chosen from vulcanized rubbers, polyoxybenzylmethylen-glycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins combined with at least one phase change material ("PCM"). The inventive compositions have lowered exotherms compared to those made without the phase change material and thus may be used in enclosed and/or poorly ventilated spaces.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
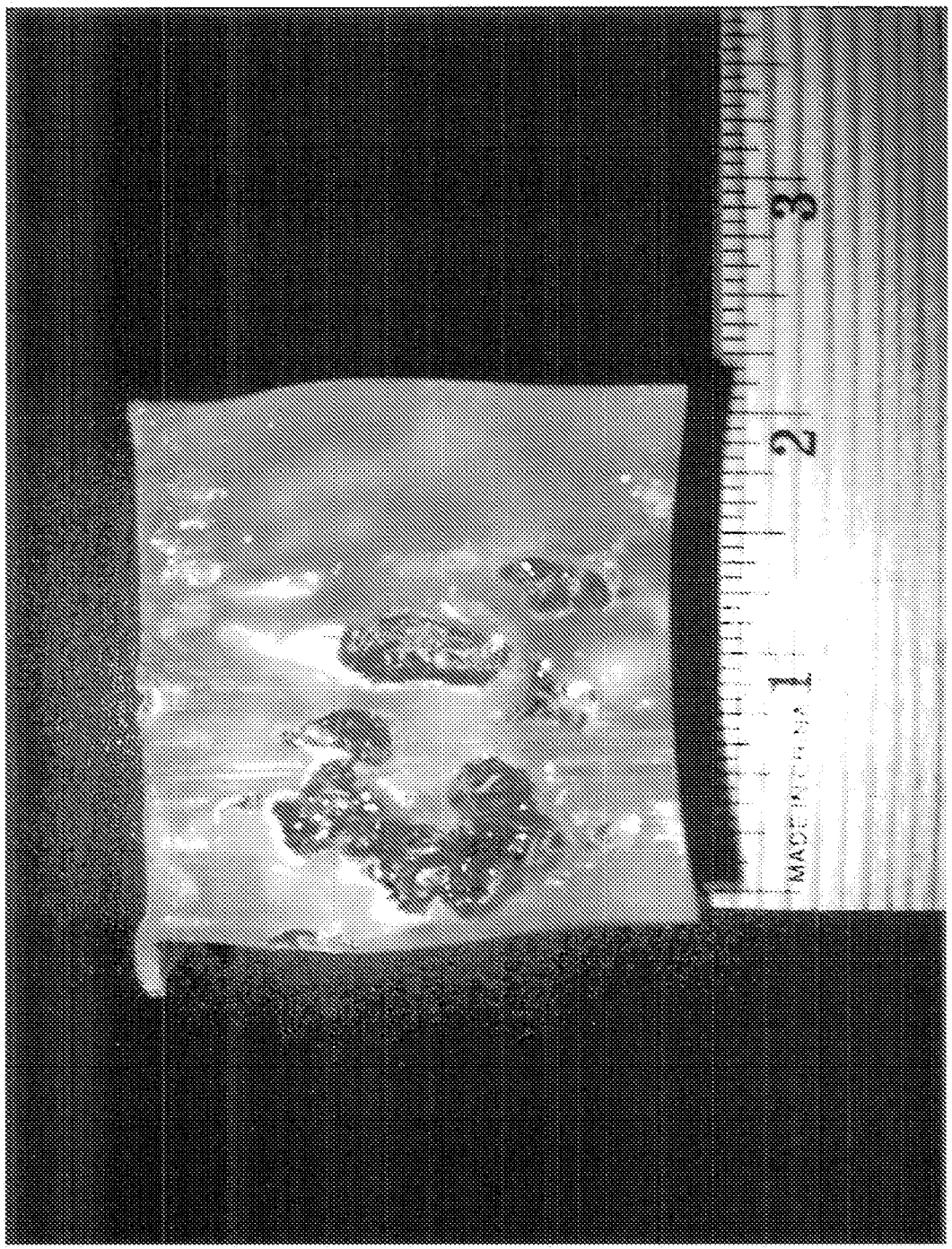
FIG. 1 is a photograph taken of a cross section of an epoxy part made with no filler or PCM.

The present invention will now be described for purposes of illustration and not limitation. Except in the operating examples, or where otherwise indicated, all numbers expressing quantities, percentages and so forth in the specification are to be understood as being modified in all instances by the term "about."

The present invention provides one of a polymer grout, a molded plastic part, a void-filling plastic material, a concrete-anchoring material and a polymeric casting including a composition made from a thermosetting polymer selected from the group consisting of vulcanized rubbers, polyoxybenzyl-methylen-glycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins and at least one phase change material ("PCM").

The present invention still further provides a process for the production of one of a polymer grout, a molded plastic part, a void-filling plastic material, a concrete-anchoring material and a polymeric casting from a thermosetting polymer, wherein the improvement involves lowering the exotherm of the polymer selected from the group consisting of vulcanized rubbers, polyoxybenzylmethylen-glycolanhydride ("Bakelite"), novolac resins, resole phenolic resins, duroplast, bismaleimide resins, polyimide resins, melarnine, acrylic resins, polyester resins, cyanate ester resins, phenolic triazine resins, paracyclophane resins and epoxy resins by combining the polymer with at least one phase change material ("PCM").

The present invention yet further provides a composition made from a thermosetting polymer selected from the group consisting of vulcanized rubbers, polyoxybenzylmethylen-glycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins and at least one phase change material ("PCM") selected from the group consisting of acrylonitrile butadiene styrene, acrylic, celluloid, cellulose acetate, ethylene-vinyl acetate, ethylene vinyl alcohol, polytetrafluoroethyelene, tetrafluorethylene-perfluorpropylene, perfluoroalkoxy, chlorotrifluoroethylene, ethylene-chlorotrifluoro-ethylene, ethylenetetrafluoroethylene, ionomers, liquid crystal polymer, polyacetal, polyacrylates, polyacrylonitrile, polyamide, polyamide-imide, polyaryletherketone, polybutadiene, polybutylene, polybutylene terephthalate, polyethylene terephthalate, polycyclohexylene dimethylene terephthalate, polycarbonate, polyhydroxyalkanoates, polyketone, polyester, polyethylene, polyetheretherketone, polyetherimide, polyethersulfone, polyethylenechlorinates, polyimide, polylactic acid, polymethylpentene, polyphenylene oxide, polyphenylene sulfide, polyphthalamide, polypropylene, polystyrene, polysulfone, polyvinyl chloride, crystalline alkyl hydrocarbons, crystalline fatty acids, crystalline fatty acid salts, crystalline fatty acid esters, crystalline olefins, crystalline alcohols, crystalline alicyclic hydrocarbons, crystalline aromatic hydrocarbons, crystalline aromatic acids, crystalline aromatic esters, crystalline aromatic acid salts, crystalline halogenated hydrocarbons, crystalline heterocyclic hydrocarbons, crystalline substituted phenols, crystalline amides, crystalline hydrocarbon ethers, crystalline nitro hydrocarbons and mixtures thereof.

Suitable thermosetting polymers for use in the present invention are known to those skilled in the art and include vulcanized rubbers, polyoxybenzylmethylen-glycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins.

Preferred as the phase change material ("PCM") in the present invention are those substances which undergo a transition involving an endothermic phase change (i.e., a phase change as a result of absorbing heat) at a temperature below the maximum exotherm that the thermosetting polymer would experience during its production in the absence of the phase change material.

The phase change material is preferably a solid at ambient temperature and pressure. (e.g., 20° C. and 1 atmosphere, respectively). Preferably, the physical transition occurs as a result of the PCM absorbing at least a portion of the heat generated by the reaction thereby resulting in the material melting, dehydrating, and/or sublimating, preferably melting. The phase change material may optionally be crystalline.

The size of the phase change material is not specifically restricted provided that the size does not have a deleterious effect on processing (i.e., the size of the particular material should not result in such an increase in viscosity of the thermosetting polymer that it becomes difficult to meter or otherwise handle). Preferably, the PCM has an average particle size of less than 1,000 μm, more preferably in the range of from 1 to 500 μm, most preferably in the range of from 10 to 200 μm. The phase change material may have an average particle size in the present invention ranging between any combination of these values, inclusive of the recited values.

The amount of PCM which is combined with the thermosetting polymer may be preferably from 0.5% to more than 30%, more preferably from 0.5% to 50% by weight, yet more preferably from 0.5% to 15% by weight and most preferably from 5% to 10% by weight, based on the weight of the thermosetting polymer. The phase change material may be present in the composition of the present invention in an amount ranging between any combination of these values, inclusive of the recited values. The amount of PCM included in the inventive compositions can be influenced by a number of factors, including the heat capacity of the specific material being used, the maximum exotherm of the thermosetting polymer being used and the viscosity of the reaction, especially at higher loadings of PCM.

As stated hereinabove, the preferred PCM has a melting point below the maximum temperature reached by the thermosetting polymer. Thus, as heat is liberated during the reaction, a portion thereof, instead of raising the exotherm of the thermosetting polymer, is absorbed by the phase change material, resulting in melting of the PCM. Because the phase change material is preferably substantially uniformly distributed throughout the thermosetting polymer, the result is an overall lowering of the maximum exotherm experienced by the polymer. This reduction dramatically improves the safety of thermosetting polymer, thus permitting its use in partially, or wholly enclosed and/or poorly ventilated spaces. As the thermosetting polymer cools, the PCM will return to its solid state.

The phase change material may preferably be an organic polymer, more preferably a thermoplastic polymer. Non-limiting examples of useful thermoplastic polymers include acrylonitrile butadiene styrene ("ABS"),acrylic, celluloid, cellulose acetate, ethylene-vinyl acetate ("EVA"), ethylene vinyl alcohol ("EVAL"), fluoroplastics such as polytetrafluoroethyelene ("PTFE"), tetrafluorethylene-perfluorpropylene ("FEP"), perfluoroalkoxy ("PFA"), chlorotrifluoroethylene ("CTFE"), ethylene-chlorotrifluoro-ethylene ("ECTFE") and ethylenetetrafluoroethylene ("ETFE"), ionomers, liquid crystal polymer ("LCP"), polyacetal ("POM"), polyacrylates (acrylic), polyacrylonitrile ("PAN"), polyamide ("PA"), polyamide-imide ("PAI"), polyaryletherketone ("PAEK"), polybutadiene ("PBD"), polybutylene ("PB"), polybutylene terephthalate ("PBT"), polyethylene terephthalate ("PET"), polycyclohexylene dimethylene terephthalate ("PCT"), polycarbonate ("PC"), polyhydroxyalkanoates ("PHA"s), polyketone ("PK"), polyester, polyethylene ("PE"), polyetheretherketone ("PEEK"), polyetherimide ("PEI"), polyethersulfone ("PES"), polyethylenechlorinates ("PEC"), polyimide ("PI"), polylactic acid ("PLA"), polymethylpentene ("PMP"), polyphenylene oxide ("PPO"), polyphenylene sulfide ("PPS"), polyphthalamide ("PPA"), polypropylene ("PP"), polystyrene ("PS"), polysulfone ("PSU"), polyvinyl chloride ("PVC"), and mixtures thereof. More preferably, the phase change material is chosen from polyethylenes, polypropylenes and mixtures thereof. Among the more preferred PCM are particulates chosen from high density polyethylene ("HDPE") and copolymers-of ethylene and butene-1.

Non-limiting examples of other useful phase change materials include paraffins, fatty acids, alcohols, tetradecanoic acid, myristamide, salts of fatty acids (e.g., calcium stearate (melting point 180° C.), zinc stearate (melting point 130° C.), zinc laurate (melting point 130° C.) and the like). Other suitable non-polymeric PCMs include crystalline alkyl hydrocarbons, crystalline fatty acids, crystalline fatty acid salts, crystalline fatty acid esters, crystalline olefins, crystalline alcohols, crystalline alicyclic hydrocarbons, crystalline aromatic hydrocarbons, crystalline aromatic acids, crystalline aromatic esters, crystalline aromatic acid salts, crystalline halogenated hydrocarbons, crystalline heterocyclic hydrocarbons, crystalline substituted phenols, crystalline amides, crystalline hydrocarbon ethers and crystalline nitro hydrocarbons.

In some embodiments of the present invention, the preferred PCM are organic particulates such as those described in U.S. Pat. No. 6,265,457, the entire contents of which are incorporated herein by reference thereto.

The inventive lowered exotherm polymer grouts and void-filling plastic materials may be especially valuable for work in locations that are partially or wholly enclosed and/or poorly ventilated where heat build-up can problematic and potentially dangerous. Molded plastic parts, concrete-anchoring materials and polymeric castings are commonly made in closed molds where heat accrual can slow production because the mold must be cooled after each process cycle. Improved compositions such as polymer grouts, molded plastic parts, void-filling plastic materials, concrete-anchoring materials and polymeric castings containing the inventive lowered exotherm thermosets may be produced by processes known to those skilled in the art.

Surprisingly, the lowered exotherm compositions of the present invention are also virtually free of bubbles, voids or expansion. The exotherm lowering effect observed with the present invention may optionally be enhanced by the addition of one or more surfactants, compatibilizers, dispersants and wetting agents to the inventive formulations.

The inventive compositions may find application in a variety of processes such as those listed in Bastone, A. and Katz, S. "Reinforced Plastics"in *Kirk-Othmer Encyclopedia of Chemical Technology*, (4$^{th}$ Ed.), vol. 21, pp. 194-206. Such processes include, hand lay-up and spray-up; vacuum bag, pressure bag and autoclave molding; resin-transfer molding and cold press molding; reaction injection molding ("RIM"); compression molding; injection molding; pultrusion; and filament winding.

The inventive compositions may also find use, for example, in improving processes for so-called "cure-in-place" pipe repair where exotherm build up may be undesirable or for other processes which involve soaking a material, such as a textile, in a medium and wrapping the material around a pipe or other item to be sealed or repaired.

EXAMPLES

The present invention is further illustrated, but is not to be limited, by the following examples. All quantities given in "parts" and "percents" are understood to be by weight, unless otherwise indicated.

The following materials were used in the examples:

| | |
|---|---|
| EPOXY: | a two-component structural epoxy available as DENEPOX I-60 from De Neef Construction Chemicals, Inc.; |
| POLYESTER: | AROPOL 7334T-15, available from Ashland Specialty Chemical; |
| MMA: | methyl methacrylate available as DENEDECK crack sealer from De Neef Construction Chemicals; |
| VINYL ESTER: | DERAKANE 8084, available from Ashland, which was promoted with 12% cobalt naphthenate at 0.3% by weight of resin; |
| PCM-A: | high density polyethylene ("HDPE") powder available as INHANCE HD-1000 Series particles from Inhace/Flouro-Seal, Ltd.; and |
| PCM-B: | a copolymer of ethylene and butane-1 powder available as XANATHANE EMT E5000 from Woodbridge Foam Corporation). |

For each example, a one-quart container was charged with the materials as detailed below in Table I (Examples C1-4: epoxy), Table II (Examples C5-7: methyl methacrylate), Table III (Examples C8-11: unsaturated polyester), and Table IV (Examples C12-14: vinyl ester). After the ingredients were mixed to homogeneity, the surface temperature was measured with a RAYTEK MINITEMP MT2 non-contact thermometer every one to seven minutes. The data presented in Tables I-IV summarize the peak temperature and exotherm reduction achieved by the addition of the phase change material ("PCM").

TABLE I

| | Example | | | |
|---|---|---|---|---|
| | C1 | 2 | 3 | 4 |
| EPOXY part A: | 250 pbw | 250 pbw | 250 pbw | 250 pbw |
| EPOXY part B | 125 pbw | 125 pbw | 125 pbw | 125 pbw |
| PCM-A | 0 pbw | 20 pbw | 94 pbw | 161 pbw |
| Filler (%) | 0 | 5 | 20 | 30 |
| Max. Surface Temperature (° F.) | 290 | 270 | 228 | 226 |

TABLE II

|  | Example | | |
|---|---|---|---|
|  | C5 | 6 | 7 |
| MMA | 250 pbw | 250 pbw | 250 pbw |
| Benzoyl peroxide | 5 pbw | 5 pbw | 5 pbw |
| PCM-A | 0 pbw | 64 pbw | 109 pbw |
| Filler (%) | 0% | 20% | 30% |
| Max Surface Temperature (° F.) | 214 | 163 | 158 |

TABLE III

|  | Example | | | |
|---|---|---|---|---|
|  | C8 | 9 | 10 | 11 |
| POLYESTER | 250 pbw | 250 pbw | 250 pbw | 250 pbw |
| Methyl ethyl ketone peroxide (MEKP) | 3.8 pbw | 3.8 pbw | 3.8 pbw | 3.8 pbw |
| PCM-A | 0 pbw | 13.4 pbw | 63.5 pbw | 108.9 pbw |
| Filler (%) | 0% | 5% | 20% | 30% |
| Max. Surface Temperature (° F.) | 290 | 272 | 229 | 226 |

TABLE IV

|  | Example | | |
|---|---|---|---|
|  | C12 | 13 | 14 |
| VINYL ESTER | 250 pbw | 250 pbw | 250 pbw |
| 12% cobalt naphthenate | 7.5 pbw | 7.5 pbw | 7.5 pbw |
| dimethylaniline (DMA) | 0.25 pbw | 0.25 pbw | 0.25 pbw |
| methyl ethyl ketone peroxide (MEKP) | 3.87 pbw | 3.87 pbw | 3.87 pbw |
| PCM-A | 0 pbw | 65 pbw | 112 pbw |
| Filler (%) | 0% | 20% | 30% |
| Max. Surface Temperature (° F.) | 311 | 230 | 228 |

As can be appreciated by reference to Tables I, II, III and IV, the peak exotherm of each resin was reduced, as compared to the control (containing no PCM), for each resin system by the addition of the PCM.

Examples C15-17

For each example, a one-quart container was charged with the materials as described in Table V. After the ingredients were mixed until homogeneous, the uncured material was transferred to a 2 in.×2 in.×2 in. polyethylene container until full and left to cure.

TABLE V

|  | Example | | |
|---|---|---|---|
|  | C15 | C16 | 17 |
| EPOXY | 250 pbw | 250 pbw | 250 pbw |
| EPOXY | 125 pbw | 125 pbw | 125 pbw |
| PCM-B | 0 pbw | 0 pbw | 94 pbw |
| aluminum trihydroxide (ATH) | 0 pbw | 94 pbw | 0 pbw |
| Filler (%) | 0 | 20% | 20% |

Figure 2:
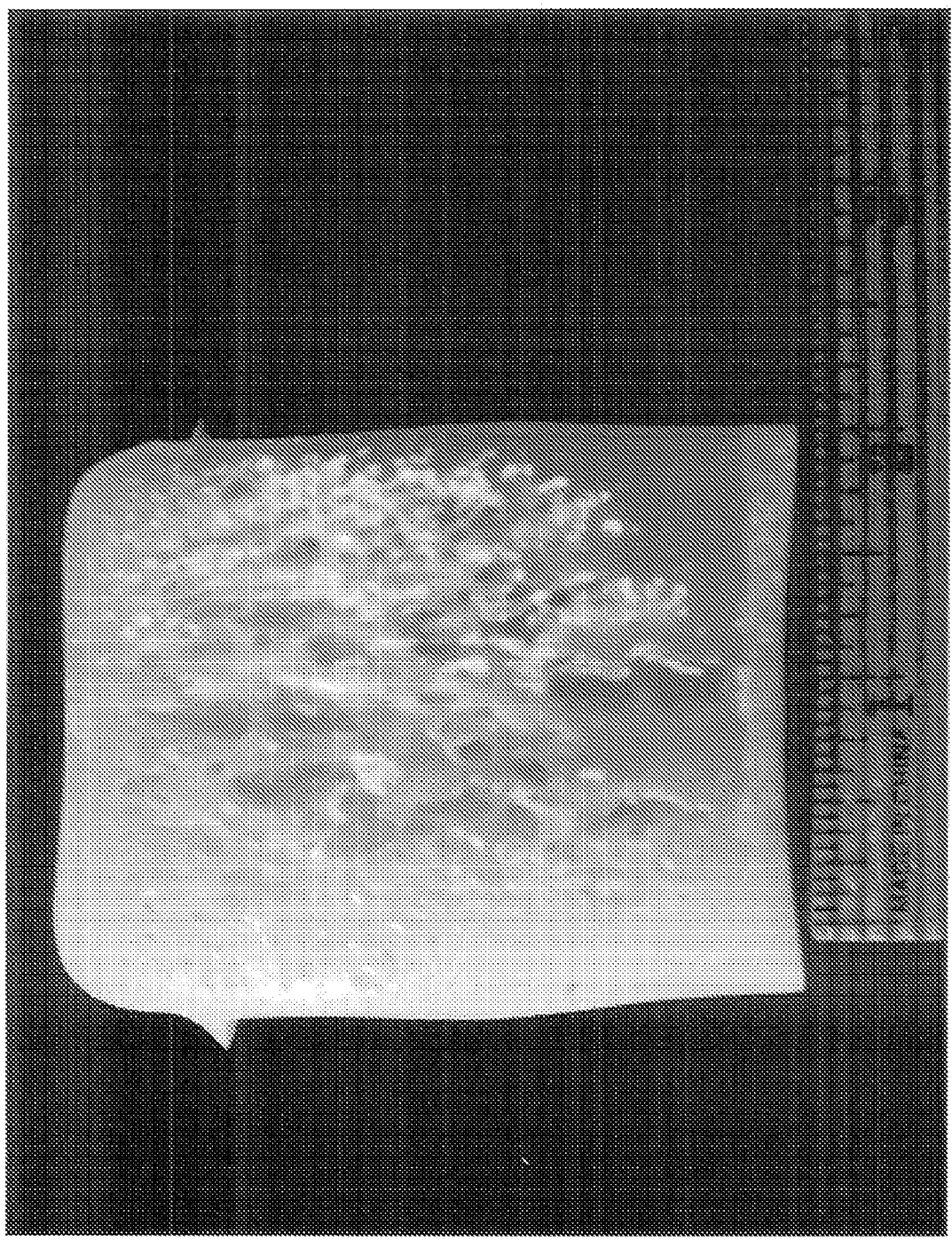
FIG. 2 is a photograph taken of a cross section of an epoxy part made with aluminum trihydroxide.
Figure 3:
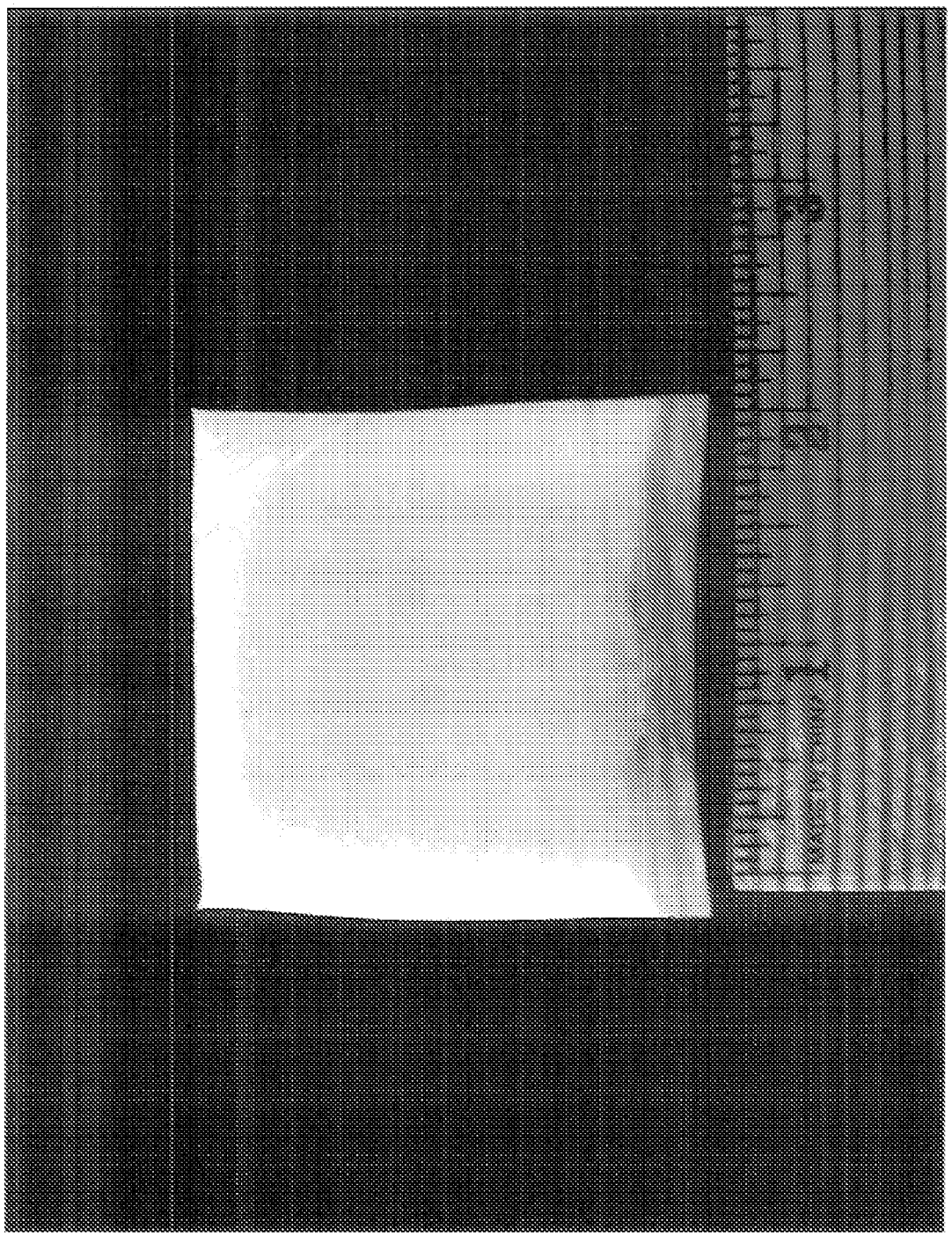
FIG. 3 is a photograph taken of a cross section of an epoxy part made with PCM according to the present invention.

Visual inspection, after cutting the cured materials in half (See FIGS. 1-3), revealed voids/bubbles in the control without filler (FIG. 1), and bubbles/expansion in the control with the common filler, aluminum trihydroxide (FIG. 2), whereas the addition of 20% PCM-B (FIG. 3) resulted in a part that was free of bubbles, voids or expansion.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. One of a polymer grout, a molded plastic part, a void-filling plastic material, a concrete-anchoring material and a polymeric casting comprising a composition comprising:
   a thermosetting polymer selected from the group consisting of vulcanized rubbers, polyoxybenzylmethylen-glycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins; and
   at least one phase change material ("PCM") selected from the group consisting of acrylonitrile butadiene styrene, acrylic, celluloid, cellulose acetate, ethylene-vinyl acetate, ethylene vinyl alcohol, polytetrafluoroethylene, tetrafluorethylene-perfluorpropylene, perfluoroalkoxy, chlorotrifluoroethylene, ethylene-chlorotrifluoro-ethylene, ethylenetetrafluoroethylene, ionomers, liquid crystal polymer, polyacetal, polyacrylates, polyacrylonitrile, polyamide, polyamide-imide, polyaryletherketone, polybutadiene, polybutylene terephthalate, polyethylene terephthalate, polycyclohexylene dimethylene terephthalate, polycarbonate, polyhydroxyalkanoates, polyketone, polyester, polyetheretherketone, polyetherimide, polyethersulfone, polyethylenechlorinates, polyimide, polylactic acid, polymethylpentene, polyphenylene oxide, polyphenylene sulfide, polyphthalamide, polystyrene, polysulfone, polyvinyl chloride, crystalline fatty acids, crystalline fatty acid salts, crystalline fatty acid esters, crystalline olefins, crystalline alcohols, crystalline alicyclic hydrocarbons, crystalline aromatic hydrocarbons, crystalline aromatic acids, crystalline aromatic esters, crystalline aromatic acid salts, crystalline heterocyclic hydrocarbons, crystalline substituted phenols, crystalline amides, crystalline hydrocarbon ethers, crystalline nitro hydrocarbons and mixtures thereof.

2. The one of a polymer grout, a molded plastic part, a void-filling plastic material, a concrete-anchoring material and a polymeric casting according to claim 1, wherein the at least one phase change material ("PCM") is high density polyethylene ("HDPE") or a copolymer of ethylene and butene-1.

3. The one of a polymer grout, a molded plastic part, a void-filling plastic material, a concrete-anchoring material and a polymeric casting according to claim 1, wherein the phase change material ("PCM") comprises from about 0.5% to greater than about 30% by weight, based on the weight of the thermosetting polymer.

4. The one of a polymer grout, a molded plastic part, a void-filling plastic material, a concrete-anchoring material and a polymeric casting according to claim 1, wherein the phase change material ("PCM") comprises from about 0.5% to about 50% by weight, based on the weight of the thermosetting polymer.

5. The one of a polymer grout, a molded plastic part, a void-filling plastic material, a concrete-anchoring material and a polymeric casting according to claim 1 further including one or more of a surfactant, compatibilizer, dispersant and wetting agent.

6. In a process for the production of one of a polymer grout, a molded plastic part, a void-filling plastic material, a concrete-anchoring material and a polymeric casting from a thermosetting polymer, the improvement comprising lowering the exotherm of the polymer selected from the group consisting of vulcanized rubbers, polyoxybenzyl-methylenglycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins by combining the polymer with at least one phase change material ("PCM") selected from the group consisting of acrylonitrile butadiene styrene, acrylic, celluloid, cellulose acetate, ethylene-vinyl acetate, ethylene vinyl alcohol, polytetrafluoroethyelene, tetrafluorethylene-perfluorpropylene, perfluoroalkoxy, chlorotrifluoroethyene, ethylene-chlorotrifluoro-ethylene, ethylenetetrafluoroethylene, ionomers, liquid crystal polymer, polyacetal, polyacrylates, polyacrylonitrile, polyamide, polyamide-imide, polyaryletherketone, polybutadiene, polybutylene terephthalate, polyethylene terephthalate, polycyclohexylene dimethylene terephthalate, polycarbonate, polyhydroxyalkanoates, polyketone, polyester, polytheretherketone, polyetherimide, polyethersulfone, polyethylenechlorinates, polyimide, polylactic acid, polymethylpentene, polyphenylene oxide, polyphenylene sulfide, polyphthalamide, polystyrene, polysulfone, polyvinyl chloride, crystalline fatty acids, crystalline fatty acid salts, crystalline fatty acid esters, crystalline olefins, crystalline alcohols, crystalline alicyclic hydrocarbons, crystalline aromatic hydrocarbons, crystalline aromatic acids, crystalline aromatic esters, crystalline aromatic acid salts, crystalline heterocyclic hydrocarbons, crystalline substituted phenols, crystalline amides, crystalline hydrocarbon ethers, crystalline nitro hydrocarbons and mixtures thereof.

7. The process according to claim 6, wherein the organic particulate is a high density polyethylene ("HDPE") or a copolymer of ethylene and butene-1.

8. The process according to claim 6, wherein the phase change material ("PCM") comprises from about 0.5% to greater than about 30% by weight, based on the weight of the thermosetting polymer.

9. The process according to claim 6, wherein the phase change material ("PCM") comprises from about 0.5% to about 50% by weight, based on the weight of the thermosetting polymer.

10. The process according to claim 6, wherein the one of a polymer grout, a molded plastic part, a void-filling plastic material, a concrete-anchoring material and a polymeric casting further includes one or more of a surfactant, compatibilizer, dispersant and wetting agent.

11. A composition comprising:
a thermosetting polymer selected from the group consisting of vulcanized rubbers, polyoxybenzylmethylen-glycolanhydride ("Bakelite"), novolac resins, resole phenolic resins, duroplast, bismaleimide resins, polyimide resins, melamine, acrylic resins, polyester resins, cyanate ester resins, phenolic triazine resins, paracyclophane resins and epoxy resins; and at least one phase change material ("PCM") selected from the group consisting of acrylonitrile butadiene styrene, acrylic, celluloid, cellulose acetate, ethylene-vinyl acetate, ethylene vinyl alcohol, polytetrafluoroethyelene, tetrafluorethylene-perfluorpropylene, perfluoroalkoxy, chlorotrifluoroethylene, ethylene-chlorotrifluoro-ethylene, ethylenetetrafluoroethylene, ionomers, liquid crystal polymer, polyacetal, polyacrylates, polyacrylonitrile, polyamide, polyamide-imide, polyaryletherketone, polybutadiene, polybutylene terephthalate, polyethylene terephthalate, polycyclohexylene dimethylene terephthalate, polycarbonate, polyhydroxyalkanoates, polyketone, polyester, polyetheretherketone, polyetherimide, polyethersulfone, polyethylenechlorinates, polyimide, polylactic acid, polymethylpentene, polyphenylene oxide, polyphenylene sulfide, polyphthalamide, polystyrene, polysulfone, polyvinyl chloride, crystalline fatty acid, crystalline fatty acid salts, crystalline fatty acid esters, crystalline olefins, crystalline alcohols, crystalline alicyclic hydrocarbons, crystalline aromatic hydrocarbons, crystalline aromatic acids, crystalline aromatic esters, crystalline aromatic acid salts, crystalline heterocyclic hydrocarbons, crystalline substituted phenols, crystalline amides, crystalline hydrocarbon ethers, crystalline nitro hydrocarbons and mixtures thereof.

12. The composition according to claim 11, wherein the at least one phase change material ("PCM") is high density polyethylene ("HDPE") or a copolymer of ethylene and butene-1.

13. The composition according to claim 11, wherein the phase change material ("PCM") comprises from about 0.5% to greater than about 30% by weight, based on the weight of the thermosetting polymer.

14. The composition according to claim 11, wherein the phase change material ("PCM") comprises from about 0.5% to about 50% by weight, based on the weight of the thermosetting polymer.

15. The composition according to claim 11 further including one or more of a surfactant, compatibilizer, dispersant and wetting agent.

16. In a process for one of hand lay-up, spray-up, vacuum bag molding, pressure bag molding, autoclave molding, resin-transfer molding, cold press molding, reaction injection molding ("RIM"), compression molding, injection molding, pultrusion and filament winding, the improvement comprising including the composition according to claim 11.

17. In a process for cure in place pipe repair, the improvement comprising including the composition according to claim 11.

* * * * *